United States Patent [19]

Larsen

[11] Patent Number: 4,640,489
[45] Date of Patent: Feb. 3, 1987

[54] MOLD FOR MAKING CONTACT LENSES, EITHER THE MALE OR FEMALE MOLD SECTIONS BEING RELATIVELY MORE FLEXIBLE

[75] Inventor: Hans-Ole Larsen, Farum, Denmark

[73] Assignee: Mia-Lens Production A/S, Copenhagen, Denmark

[21] Appl. No.: 777,667

[22] Filed: Sep. 19, 1985

Related U.S. Application Data

[60] Division of Ser. No. 549,702, Nov. 7, 1983, Pat. No. 4,565,348, which is a continuation-in-part of Ser. No. 360,107, Mar. 19, 1982, Pat. No. 4,495,313.

[51] Int. Cl.$^4$ ............... B29C 39/40; B29C 33/40; B29C 39/26
[52] U.S. Cl. ............................. 249/122; 249/125; 249/127; 249/134; 249/142; 425/808
[58] Field of Search ............... 425/808; 249/119, 120, 249/122, 127, 125, 134, 147

[56] References Cited

U.S. PATENT DOCUMENTS

| | | | |
|---|---|---|---|
| 2,253,697 | 8/1941 | Genesy | 425/808 |
| 3,423,488 | 1/1969 | Bowser | 425/808 |
| 3,555,610 | 1/1971 | Reiterman | 425/808 |
| 3,605,195 | 9/1971 | Campbell | 425/808 |
| 3,830,460 | 8/1974 | Beattie | 425/808 |
| 3,841,598 | 10/1974 | Grucza | 425/808 |
| 3,871,803 | 3/1975 | Beattie | 425/808 |
| 3,894,710 | 7/1975 | Sarofeen | 425/808 |
| 3,915,609 | 10/1975 | Robinson | 425/808 |
| 4,017,238 | 4/1977 | Robinson | 425/808 |
| 4,197,266 | 4/1980 | Clark et al. | 264/2.3 |
| 4,211,384 | 7/1980 | Bourset et al. | 425/808 |
| 4,279,401 | 7/1981 | Ramirez et al. | 249/124 |

Primary Examiner—Willard E. Hoag
Attorney, Agent, or Firm—Lawrence Rosen

[57] ABSTRACT

A plastic mold assembly comprising a male and female section for casting soft contact lenses from a polymerizable feed material wherein compensation for polymerization shrinkage is attained and disengagement of the male and female mold sections is facilitated by providing one flexible and one rigid mold section. Good optical properties of the mold surfaces are obtained by forming the mold sections entirely from a thermoplastic material such as polystyrene that will not crystallize when cooled from a melt. In one embodiment a plurality of flexible male sections having convex molding surfaces and a plurality of rigid female sections having concave molding surfaces are supported on frames to attain an increased production rate of finished soft contact lenses.

10 Claims, 6 Drawing Figures

MOLD FOR MAKING CONTACT LENSES, EITHER THE MALE OR FEMALE MOLD SECTIONS BEING RELATIVELY MORE FLEXIBLE

This is a division of application, Ser. No. 549,702, filed Nov. 7, 1983, now U.S. Pat. No. 4,565,348, and which application is a continuation in part of application, Ser. No. 360,107, filed Mar. 19, 1982, now U.S. Pat. No. 4,495,313.

FIELD OF THE INVENTION

The present invention relates to new and improved molds for the manufacture of soft contact lenses. More particularly, the invention pertains to molds prepared from plastic materials and which can be effectively employed for the continuous or semicontinuous manufacture of a plurality of essentially finished soft contact lenses.

BACKGROUND OF THE INVENTION

The increase in the popularity of soft contact lenses has led to many proposals for their manufacture. Prior art patents are replete with suggestions for various processing procedures for improving both the contact lens products and the manufacture thereof. The type and characteristics of the molds utilized in such manufacturing operations have received attention, since their ability to function in the desired manner as well as thier cost are important commercial factors. However, in most prior processes the polymeric material used to fabricate the lenses and the processing operations used to form and finish the lenses are of primary importance.

It has been recognized that for the manufacture of soft contact lenses a casting process would be most advantageous. In the spin casting process as taught in U.S. Pat. No. 3,408,429, U.S. Pat. No. 3,496,254 and U.S. Pat. No. 3,660,545 the polymerizing mixture is contained in a rotating open mold having a concave surface. The anterior convex surface of the lens is thus formed by the mold surface, and the posterior, concave surface of the lens is formed as a result of centrifugal forces, surface tension of the polymerizing mixture, and other factors. The concave surface of the lens thus formed is approximately parabolic in shape and the operation must be carefully controlled to achieve reproducible shapes.

Other casting processes are based on the casting of contact lenses in closed molds. The prior art methods are primarily directed towards overcoming the lens quality problems which result from polymerization shrinkage and other variables in the molding process. With most monomeric materials the volumetric shrinkage on polymerization is in the range of 12 to 22%. For example, as taught in U.S. Pat. No. 3,660,545 (cols. 1 and 2) a polymerizing methacrylate ester mixture held in a closed glass mold invariably would pull away from at least one mold surface and cause the formation of surface voids which rendered the cast object unsuitable as a lens.

In the pior art method discussed in U.S. Pat. No. 3,660,545 the polymerizing mixture was held between concave and convex glass mold members having an annular gap interposed between them which decreased as polymerization occurred. An irregular edge configuration resulted from shrinkage which edge portion could be removed by cutting.

A further prior art method disclosed in U.S. Pat. Nos. 4,208,364 and 4,121,896 teaches the use of a mold comprising a male portion, a female portion, and a flexible rim portion. The male portion comprises one molding surface and the female portion similarly comprises a second molding surface. In the preferred embodiments both the male and the female portions each has a cylindrical support segment. When the mold is closed the male cylindrical segment fits into the female cylindrical segment. The flexible rim is attached circumferentially around one of the molding surfaces. During operation of the process the polymerization material is placed in the concave part of the mold and the male portion is placed into the female portion in such a manner that the tip of the flexible rim just touches the opposite molding surface. During the molding stage the molding material will contract as much as 20% and a potential vacuum is formed in the mold cavity. Under the external atmospheric pressure the two mold portions will move towards each other which movement is permitted by the flexibility of the rim. After polymerization the mold portions are separated and the lens produced stripped out from the mold.

When the rim is flexed the tip of the rim moves in a radial direction relative the axis of the lens. This movement is, however, far from predictable or uniform, since it depends on how much a given segment of the tip adheres to the mold surface. Also the movement may result in damage to the gel structure of the polymer and it is a normal part of the process that the edges have to be polished. Thus, the process has the usual disadvantage resulting from the necessity of finishing the lenses individually. A further disadvantage of the mold construction is that with certain lens configurations especially of minus power and with high water content the central portion of the lens tends to have poor optical properties.

Another mold construction is disclosed in U.S. Pat. No. 4,209,289. The mold having continuous mating surfaces with the parting line at the junction of the lens edge and anterior lens surface. An improved version of this mold construction is disclosed in U.S. Pat. No. 4,284,399; the improvement being that a groove is cut in the mating surface of the concave mold member. The area of said mating surface is thus reduced. It is stated that by proper choice of softening point temperature of the mold material, curing temperature of the contact lens material, and other factors such as dimensions of mating surfaces and weight placed on top of the mold, mold thickness in the area of the cavity and flexibility of the mold material, pre-release and distortion during cure can be controlled, and a lens having a finished edge can be cast. Polypropylene is the preferred mold material, and the mold thickness behind the concave and convex molding surfaces can range from 0.015 to 0.045 inch (0.38 to 1.14 mm). This mold construction is most suitable for casting of xerogel lenses (monomers without solvent or diluent) having polymerization shrinkage of 10 to 20% by volume.

In U.S. Pat. No. 4,197,266 a mold constuction is disclosed which comprises first and second members each having a mold surface. Furthermore, the assembled mold also includes an annular reservoir which surrounds the mold cavity. The reservoir is connected to the mold cavity via a gap which is defined by co-operating aligning surfaces on the first and second mold member. In operation, the monomer held in the reservoir is held in an unpolymerized state and allowed to flow into the mold cavity via the gap during the polymerization. Any monomers which polymerize within the gap area may be subsequently removed from the lens by an edge contouring step.

The problems associated with shrinkage occuring during polymerization are recognized in U.S. Pat. No. 4,211,384 teaches utilizing a mold having a flexible gasket that deforms during polymerization thereby permitting the mold surfaces to be pressed together.

Recently issued U.S. Pat. No. 4,347,198 also addresses the shrinkage problem caused by polymerization. In this patent the disclosed process has the disadvantage of requiring the autoclave in order to avoid formation of voids and hollows. Although this patent discloses that the mold may be made from plastic, glass or metal, the preferred material is stated to be glass. All of the examples appear to be directed to the use of glass molds, which along with metal molds are prohibitively expensive. Despite the obvious advantages of lower costs, this patent fails to teach the art how to use plastic molds for this purpose.

There is a further requirement in this patent which calls for using very large amounts of solvent in the polymerizable mixture. This is required because of the limitations on polymerization shrinkage which can be handled in process. As an example: Whereas pure HEMA monomer will shrink 21-22%, the patented process handle 5% shrinkage during polymerization at the most, and in practice 3.5% is the upper limit. In order to prepare a lens from HEMA it is therefore necessary to add sufficient solvent to bring the shrinkage of the polymerizing mixture down below 3.5% which means that the original solution will contain about 20% HEMA and 80% solvent. When after polymerization the lens precurser is soaked in water in order to replace the solvent with water, a considerable shrinkage will take place since the equilibrium water content of a poly-HEMA lens is about 40%. Such shrinkage is highly undesirable especially in an automated highly productive lens production since it introduces a source of variations and inaccuracies due to inhomogeneous and variable shrinkage of the lenses following the casting.

OBJECTS OF THE INVENTION

One object of the present invention is to provide an improved mold assembly for producing contact lenses.

Another object of the present invention is to provide a two piece mold for forming soft contact lenses and which avoids the shortcomings of the previously proposed molds.

A further object of the present invention is to provide a disposable plastic mold assembly which can be effectively utilized to prepare directly finished soft contact lenses.

A still further object of the present invention is to provide a plastic mold for manufacturing a plurality of soft contact lenses in continuous or semi-continuous method of operation.

These and other objects of the present invention will become more readily apparent from the following descriptions of specific features and illustrative embodiments.

SUMMARY OF THE INVENTION

As discussed above, one of the problems associated with the manufacture of soft contact lenses is shrinkage of the lens material which occurs during polymerization and which could result in the introduction of unacceptable voids, hollows or stresses in the lens product. For commercial operations, it would also be desirable to produce directly a lens product which was substantially finished in the molding operations and, therefore, did not require subsequent finishing treatments by highly trained artisans. The production of a plurality of soft contact lenses in continuous or semicontinuous operations would also be highly advantageous. Most disclosures which discuss the use of plastic for fabrication of the molds merely hold it to be an equivalent of metals or glass and no special instructions are provided. Where, as in U.S. Pat. No. 4,284,399, polypropylene is disclosed as being the preferred mold material, limited information is provided on the construction or design of the mold.

In accordance with the present invention it has been found that in order to obtain high quality soft contact lens the mold should be prepared from certain plastics, particularly those polymers which do not exhibit any significant crystallization during cooling from the melt. Thus, the most preferred material for the molds of this invention is polystyrene. This thermoplastic polymer will not crystallize, has a low shrinkage, and can be injection molded at a relatively low temperature to surfaces of optical quality.

Another aspect of the present invention is the discovery that one section of the mold assembly should be fleixble in order to compensate for polymerization shrinkage. However, the male and female mold sections should not have equal flexibility; otherwise, the deflection resulting from shrinkage will become distributed between the mold sections in an unpredictable and unreproducible manner.

DETAILED DESCRIPTION OF THE INVENTION

The present invention will be described more specifically in connection with the attached drawings. Although certain mold designs and assemblies are illustrated in these drawings, it should be understood that the invention is not to be construed as limited to these designs but is in fact more broadly applicable to thermoplastic molds having a variety of designs and constructions. Moreover, single or plurality mold constructions are intended to be encompassed by the present invention.

Figure 1:
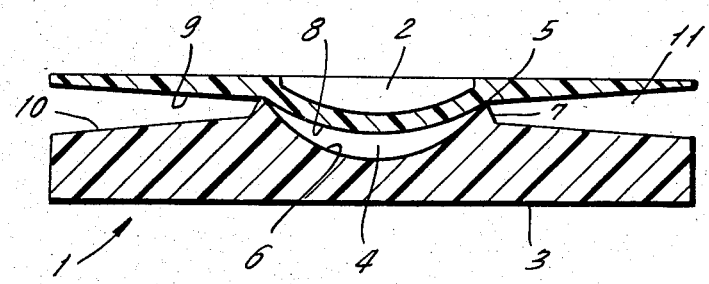
FIG. 1 is a schematic cross-section of a soft contact lens mold that can be fabricated in accordance with the present invention.

It should be noted that FIG. 1 is a mold design shown in recently published U.K. Patent Application No. 2,097,805A which is based on U.S. patent application Ser. Nos. 259,115 filed 8/21/81 and 360,107 filed 3/19/82. The published U.K. Patent Application as well as its U.S. counterparts are incorporated herein by reference.

Referring again to FIG. 1, mold 1 takes the form of an upper part of convex lid 2 which is relatively thin and more flexible than lower part 3. The shape of the surfaces outside mold cavity 4 is such that contact between the upper and lower parts 2 and 3 occurs only at ring 5 around the mold cavity 4. More particularly, the lower part 3 has a concave surface portion 6 which has a relatively sharply defined peripheral edge portion 7 in an annular region thereof. The lid 2 has a convex surface portion 8 in an annular region thereof. When lid 2 and lower part 3 are placed together so that edge portion 7 engages a cooperating annular region on the convex surface 8, the concave portion 6 and convex portion 8 jointly define a volume 4 of the mold cavity having a contact lens shape. The convex surface portion and the concave surface portion are provided with peripherally extended skirt regions 9, 10 which are spaced apart from one another about 0.5 to 1.5 mm with the space preferably increasing radially outward from the mold cavity at a 5 to 10 degree slope to provide a ring shaped converging area 11 defined by the space between skirt portions 9, 10 which serves as a reservoir for monomer during polymerization. As the polymerization reaction progresses, shrinkage of the contents within the mold cavity 4 occurs creating a slight negative pressure. The negative pressure causes sufficient additional monomer to be drawn into the mold cavity to compensate for the shrinkage. At a later stage of the polymerization the viscosity of the polymer solution increases to the point where additional material cannot be drawn into the mold cavity, whereupon the two parts of the mold are drawn together and the relatively sharp edge 7 impinges against the lid at 5 to thereby provide a neat, well defined contact lens edge substantially free from irregularities.

Figure 2:
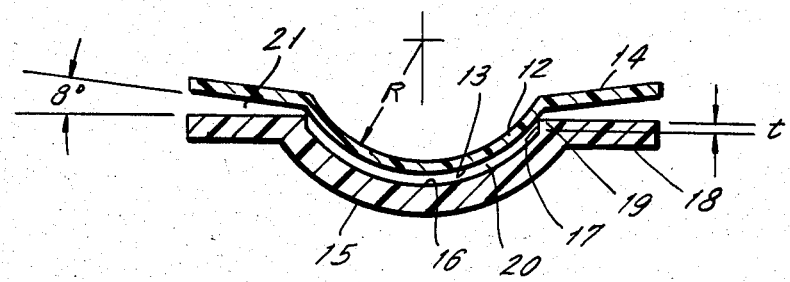
FIG. 2 is a schematic cross-section of another soft contact lens mold that can be fabricated in accordance with the present invention.

FIG. 2 illustrates another mold construction that may be utilized wherein first mold section 12 has a substantially spherical convex optical surface 13 terminating in peripherally extending annular flange 14. Second mold section 15 has a concave optical surface 16 terminating in cylindrical surface 17 which in combination with peripherally extending annular flange 18 forms sharply defined substantially 90° edge at 19. When the first and second mold sections are placed together to form the mold assembly as shown in FIG. 2, the convex surface 13 and the concave surface 16 jointly define mold cavity 20 therebetween which has a contact lens shape with a lens edge thickness corresponding to the axial dimension of cylindrical surface 17.

The space between the facing surfaces of peripherally extending flanges 14 and 18 defines a ring shaped converging reservoir 21 which retains excess monomer during the polymerization as described above.

Figure 3:
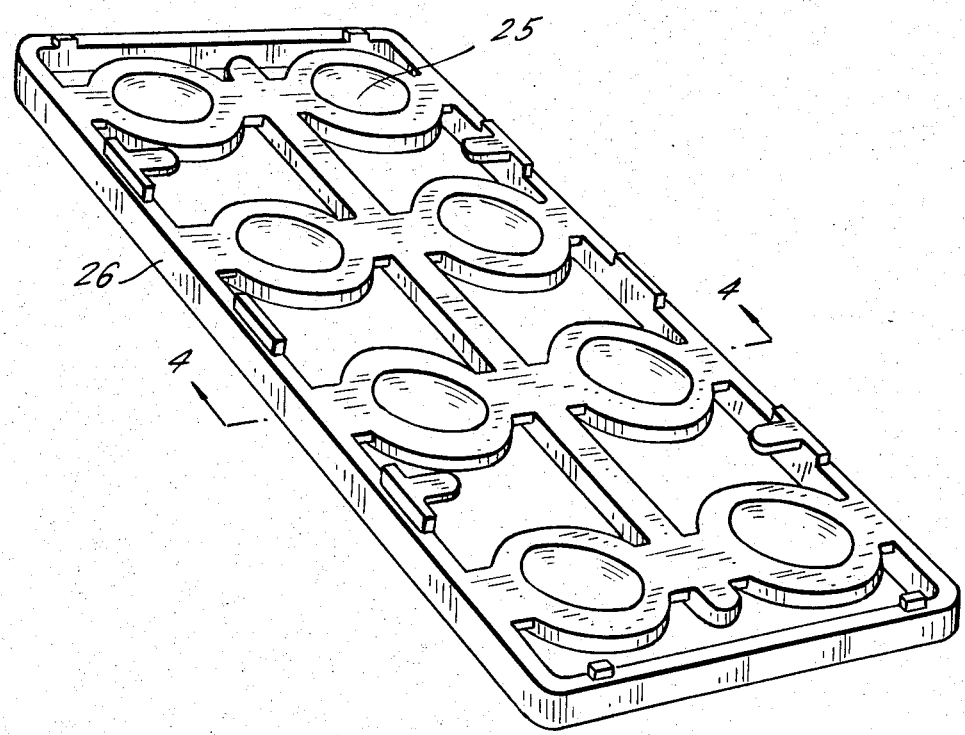
FIG. 3 is a perspective view of a molding frame carrying a plurality of concave molds corresponding to the mold of FIG. 2.
Figure 4:
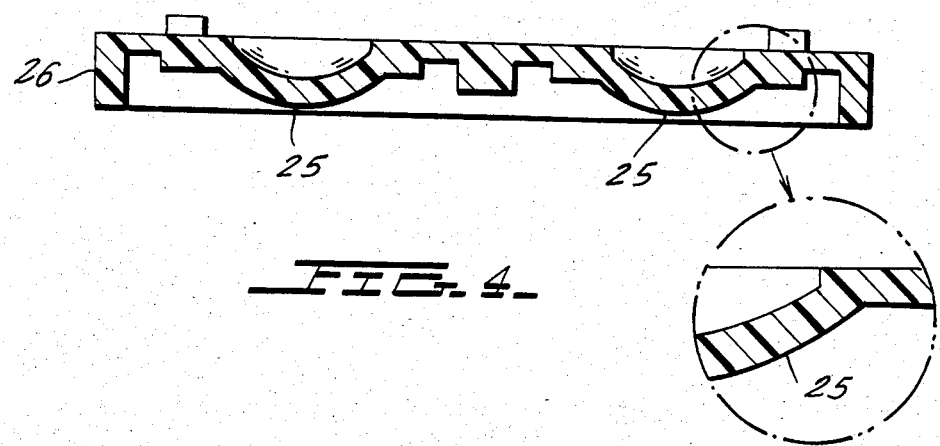
FIG. 4 is a view in cross-section through the molding frame of FIG. 3 at line 4—4.
Figure 6:
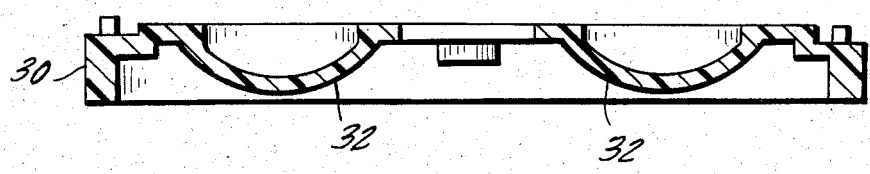
FIG. 6 is a view in cross-section through the molding frame of FIG. 5 at line 6—6.

FIGS. 3 and 6 show a particular mold assembly design suitable for producing a plurality of soft contact lenses. In FIG. 3 individual concave mold units 25 are placed symmetrically around one or more points which function as injection points (not shown) during the injection molding of the mold frame 26. For instance, the frame may contain four mold units placed substantially symmetrical with respect to one point or two or more such groups of four each having a common injection point can be combined into one frame. Also units of 2, 3 and 5 can be designed; and, if desired, combined as long as the frame does not get too large to handle. The symmetrical designs of the frame are found to give less variations in flow pattern and temperature gradients during the injection molding process and thus reduce the variations in dimensions from mold unit to mold unit.

Figure 5:
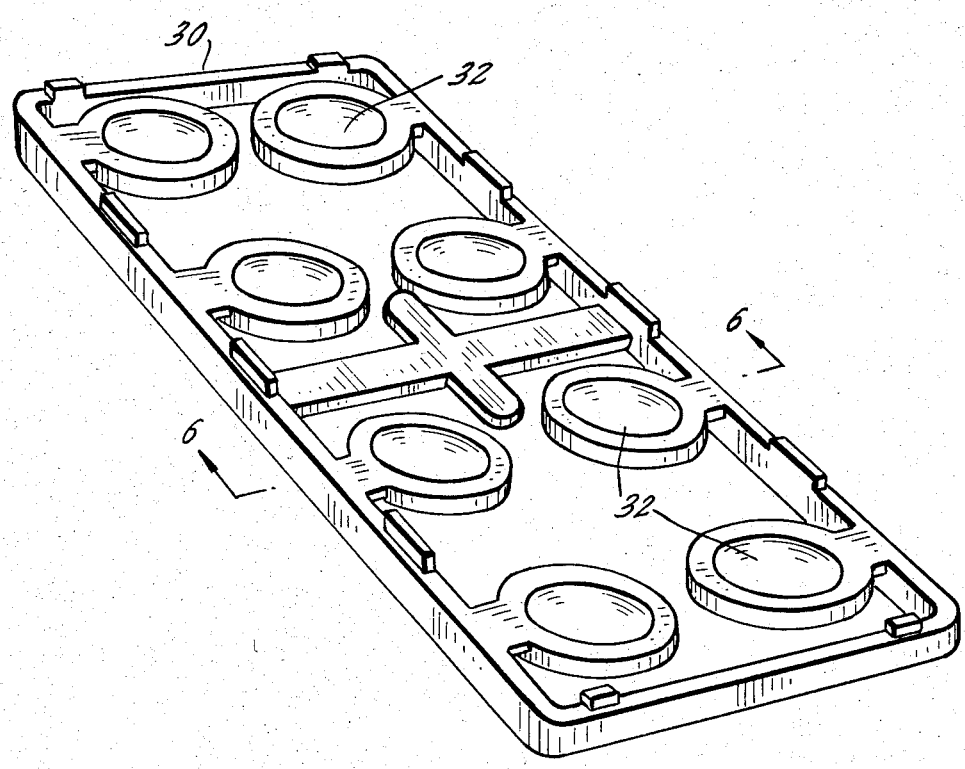
FIG. 5 is a perspective view of a molding frame carrying a plurality of convex mold covers corresponding to the mold of FIG. 2.

After the dosing step in which the convex mold 25 is substantially filled with the polymerization mixture, the concave molds 25 are convered with the convex mold members or lids 32, as shown in FIG. 5, in a manner where no air bubbles are trapped beneath the convex molding surface and lids 32 are brought to rest on the concave mold members 21 properly aligned and without distortion. This is preferably done with lids which are put on as individual units free to float and align themselves on the pool of polymerizable mixture held in the concave mold.

Although the convex mold members 32 in this and the following process steps can be used as separate units and not as a plurality held on a frame, it is preferred that they initially are held on a frame for more uniform processing and protection of the convex molding surface. Thus, in a particular preferred version of the process, the convex mold members 32 are manufactured by injection molding as a plurality of convex mold members held on a frame 30. The term "frame" as used in the present context can mean any structural element which can hold a plurality of mold members and allow their use in the present process. The frame 30 can thus be a structure having a rectangular shape inside which one or more rows of mold members 31 are held. The frame may also be a central rod on which one or both sides is connected to the mold members. In a particular preferred version the frame is shaped like a ribbon molded to a rectangular shape as best in the cross-section view of FIG. 6. In the rectangular area two rows of 2 to 6 mold members are positioned and held on the frame by small struts. The height of the frame is such that the surfaces of the molds are protected from scratching and mechanical damages during handling, and the frame in general has a shape facilitating stacking and handling up to and including the mold covering step.

In the mold covering step the plurality of convex mold members 32 are separated from frame 30 by breaking or cutting. The struts connecting frame and mold members should preferably be held by some sort of mechanical device (not shown) which will hold the convex mold members while they are separated from the frame and which thereafter can be used to guide them down and place them all simultaneously on each of the concave mold members containing the polymerizable mixture. The lids 32 can be put on immediately after the polymerizable mixture is added to concave molds or after any period of time which may be found suitable with the specific combination of composition of polymerizable mixture and equipment employed in a given production.

The molds can be made from any thermoplastic material which is suitable for mass production and can be molded to an optical quality surface and with mechanical properties which will allow the mold to maintain its critical dimensions under the process conditions employed in the process discussed in detail below. The concave and convex mold members can thus be made from thermoplastic resins. Examples of suitable materials include polyolefins such as low, medium, and high density polyethylene, polypropylene, including copolymers thereof; poly-4-methylpentene; and polystyrene.

Other suitable materials are polyacetal resins, polyacrylethers, polyarylether sulfones, nylon 6, nylon 66 and nylon 11. Thermoplastic polyesters and various fluorinated materials such as the fluorinated ethylene propylene copolymers and ethylene fluoroethylene copolymers may also be utilized.

It has been found, however, that with the need for a high quality, stable mold and especially for the use of a plurality of molds held on a frame the choice of material for the molds is significant. In the present invention the quality of production is not assured by individual inspecting and sorting each lens for power and curvature. Instead the quality is assured by keeping the dimensions of each individual mold member within very tight tolerances and processing molds in particular sequential steps to give all lenses equal treatment. Since polyethylene and polypropylene partly crystallize during cooling from the melt there is a relatively large shrinkage giving dimensional changes difficult to control. Thus, it further has been found that the most preferred material for the molds used in the present process is polystyrene which does not crystallize, has low shrinkage, and can be injection molded at relatively low temperature to surfaces of optical quality. It will be understood that other thermoplastics, including those mentioned above, may be used provided they have these same properties. Certain copolymers or blends of polyolefins that exhibit these desirable characteristics are also suitable for the present purposes as are polystyrene copolymers and blends having such characteristics.

Finally, it is noted that the effective and desirable use of polystyrene mold material for the casting of contact lenses in unexpected sine polystyrene is commonly believed to be attacked by many of the monomers used in the polymerizable mixtures. In fact, is has been found that most of the preferred polymerizable mixtures will not attack the mold surfaces during the process, even with long periods of time between dosing and polymerization. For other mixtures any slight tendency to attack can be counteracted by reducing the exposure period or by lowering the processing temperature and/or by other manipulations of the process parameters.

As an illustrative embodiment of the present invention mold frames each holding 8 concave mold members or sections were injection molded in their entirety from polystyrene. The concave molding surface of the female mold section had a central spherical area of 9.615 mm diameter with a radius of curvature of 8.808 mm. From diameter 9.615 to diameter 11.8 mm the radius was 8.44. From diameter 11.8 to 12.7 the radius was 7.50 mm. At 12.7 mm a cylindrical surface extended axial upwards for 0.135 mm ending in a sharp edge formed by said cylindrical surface and a peripherally extending skirt or rim having a width of 2 mm and falling in a 8 degree slope away from the mold cavity in a radical direction. This thickness of the polystyrene forming the concave mold section was 1.6 mm.

A second set of frames each holding b 8 convex male mold members were similarly injection molded from polystyrene. The optical convex molding surface was spherical with a radius of 8.164 mm. The spherical surface had a diameter of 16 mm and was surrounded by a flat rim of 2 mm width extending from the periphery of the spherical surfaces. The thickness of the convex mold members was 0.55 mm. In the assembled mold the sharp edge of the concave surface impinges on the convex surface of the male mold section to define the edge of the lens having a thickness corresponding to the axial length of the cylindrical surface, and the facing surfaces of the rim portions are spaced apart about 1 mm.

As discussed above, one of the mold members should be more flexible or elastic than the other in order to compensate for at least a part of the shrinkage of the polymerization mixture which occurs during polymerization. If both mold members are inflexible or of substantially equal flexibility the results would be adverse, since variations in lens curvature and power would occur from mold to mold.

In the preferred mold configuration it is the convex lid member which has this greater flexibility or elasticity. The desired flexibility is obtained by controlling the composition or thickness of the convex mold member. In the case of polystyrene it is a matter of a few simple experiments with lids of different thicknesses to determine optimum thickness for any particular mold size and polymer composition.

It is readily observed when a lid is too rigid that the optical properties of the lens, particularly in the thinner areas are inferior. The reason is that the contracting forces set up by polymerization shrinkage will act over the entire area of the mold surfaces and try to pull them together. If both mold surfaces are rigid the absolute movement, i.e. delta t, will be the same over the full cross section of the lens ("piston effect"). Since the lens thickness t varies from place to place, delta t will not be the same percentage of t over the cross section. In some areas delta t will correspond exactly to the linear shrinkage during polymerization. In thicker sections it will be less and in the thin sections it will be considerably larger than linear linkage and will squeeze the partially polymerized gel away from the thin area, creating optical flaws and defects.

The embodiment where the convex mold portion is characterized by greater flexibility than the concave mold portion has another important advantage. More particularly, the flexibility enables one to effect disengagement of the concave and convex mold members much more easily than with rigid molds made from glass or metals. This is a very important consideration since the polymerizable mixtures are very adhesive towards many materials, including glass and metal. The opening of the molds is thus very difficult and various means of softening the material held in the lens cavity has to be employed. In the process of U.S. Pat. No. 4,347,198 for example, the glass molds are hydroxyl containing compound(s) is about 10:90 to 50:50 by weight.

Preferably the ratio of boric acid to hydroxyl containing compounds is about 20:80 to 45:55 and the ratio of boric acid to polyhydroxyl compound is about 15:85 to 40:60 by weight. As a general rule, the boric acid ester will constitute about 35–90 volume percent preferably about 45–80 volume percent, based on the combined volume of the monomers being polymerized and the boric acid ester.

It should be further understood, however, that a diluent or water soluble component need not be employed in the polymerizable feed mixture. If such a component is employed, however, then one may select a suitable water replaceable substance. In such a case the use of a water replaceable boric acid is especially preferred.

The polymerizable components of the feed are preferably the acrylic or methacrylic monomer system of U.S. Pat. No. Re. 27,401 which is a combination of an acrylic or methacrylic acid monoester with a minor amount of a diester of acrylic or methacrylic acid. Polymerization systems in which vinyl, acrylic or methacrylic monomers are copolymerized with such materials as hydroxyethyl acrylate, vinyl pyrrolidone, acrylamides, or the like can also be used. As examples hydroxyethyl methacrylate, methylmethacrylate, hydroxypropyl methacrylate, glycidylmethacrylate, diacetoneacrylamide or vinylacetate can be used in combination with acrylamide, hydroxyethyl acrylate, acrylic acid, or glyceryl methacrylate.

Especially preferred for the polymerizable acrylic monomer is hydroxyethyl methacrylate (HEMA) and, most preferably, the polymerizable acrylic monomer is a combination of a major portion of HEMA combined with a minor portion of another monomer, which is preferably hydroxyethyl acrylate (HEA).

The polymerization can be catalyzed by any of the processes employed heretofore. Although conventional thermal induced polymerization can be effected, it has been noted that this process tends to lead to stress and decreased homogeneity in the lenses. It is therefore preferred to induce polymerization in the systems of the present invention by means of ultraviolet light. Accordingly, if desired or necessary, an ultraviolet light catalyst can be added to the polymerization system. The photocatalyst used can be any of the known catalysts sufficiently soluble in the monomer mixture to effect an essential complete polymerization. The polymerization is effected in the substantial absence of water, but a small amount of a crosslinking agent with a functionality of 2 or greater may be added to the monomer or monomer mixture. An example of a preferred crosslinking agent is ethylenglycol dimethacrylate.

Various changes and modifications can be made in the casting molds of this invention without departing from the spirit and scope thereof. The various embodiments disclosed in the application were for illustrative purposes only and were not intended to limit the invention.

What is claimed is:

1. A lens mold assembly comprising a plurality of female mold sections having a concave optical surface terminating in a peripherally extending annular flange, the surface of said flange forming a sharp edge at the intersection with said concave optical surface;

a plurality of male mold sections having a substantially spherical convex optical surface terminating in a peripherally extending annular flange;

the maximum outside diameter of the convex surface of said male mold section being greater than the maximum inside diameter of the concave surface of said female mold section whereby said sharp edge of said female mold section impinges on said convex surface of said male mold section to form a mold cavity in said mold assembly with the facing surfaces of said peripherally extending annular flanges of said female and male mold sections being spaced apart;

one of said female or male mold sections having relatively greater flexibility than the other section whereby compensation for shrinkage during polymerization of monomers within the mold cavity is afforded by said relatively more flexible mold section; and each of said female mold sections being attached to a supporting frame by a tab or bar extending between said female mold sections and said supporting frame, and each of said male mold sections being individually centered on a respective female mold section to define said mold cavity.

2. A lens mold assembly of claim 1 wherein said male mold section has relatively greater flexibility than said female mold section.

3. A lens mold assembly of claim 2 wherein said male and female mold sections are fabricated of polystyrene.

4. A lens mold assembly of claim 3 wherein said male mold section has a thickness of about 0.5 millimeters and said female mold section has a thickness of about 1.5 millimeters.

5. A lens mold assembly of claim 1 wherein the space between said peripherally extending flanges of said female and male mold sections is from about 0.5 to 1.5 millimeters.

6. A lens mold assembly of claim 5 wherein the space between said peripherally extending flanges of said female and male mold sections increases radially outward from the mold cavity at a 5 to 10 degree slope.

7. A lens mold assembly of claim 2 wherein said sharp edge at the intersection of said concave optical surface and said peripherally extending flange is substantially a 90° angle.

8. A lens mold assembly of claim 7 wherein said concave optical surface of said female mold section is cylindrical at the intersection with said peripherally extending flange.

9. The mold assembly of claim 1 wherein said supporting frame is formed from the same thermoplastic material as the female sections supported thereon.

10. The mold assembly of claim 1 wherein said male and female sections are disposable.

* * * * *